United States Patent
Atherley

(10) Patent No.: US 6,386,630 B1
(45) Date of Patent: *May 14, 2002

(54) LIGHT-WEIGHT SNOWMOBILE SEAT

(76) Inventor: James Atherley, 113 E. Teal Rd., Saratoga Springs, UT (US) 84043

( * ) Notice: Subject to any disclaimer, the term of this patent is extended or adjusted under 35 U.S.C. 154(b) by 0 days.

This patent is subject to a terminal disclaimer.

(21) Appl. No.: 09/611,396

(22) Filed: Jul. 7, 2000

Related U.S. Application Data

(63) Continuation-in-part of application No. 09/358,179, filed on Jul. 20, 1999, now Pat. No. 6,086,149, which is a continuation-in-part of application No. 08/948,691, filed on Oct. 10, 1997, now Pat. No. 5,944,380.

(51) Int. Cl.$^7$ .............................. B60N 2/40; B62J 1/22
(52) U.S. Cl. ................ 297/195.11; 297/195.1; 297/195.13; 297/214; 297/219.11; 297/452.48; 297/456.61; 297/DIG. 1; 297/DIG. 6; 180/219
(58) Field of Search .................. 297/195.1, 195.13, 297/214, 219.11, 452.48, 452.61, DIG. 1, DIG. 6; 180/219

(56) References Cited

U.S. PATENT DOCUMENTS

| | | | |
|---|---|---|---|
| 3,388,946 A | 6/1968 | Grace ..................... 297/195 X |
| 3,588,171 A | 6/1971 | Rich, Jr. ................. 297/214 X |
| 3,627,073 A | 12/1971 | Grimm .............. 297/215.11 X |
| 3,741,596 A | 6/1973 | Cate ....................... 297/215.11 |
| 3,927,727 A | 12/1975 | Hanagan .............. 297/195.1 X |
| 4,095,820 A | 6/1978 | Hanagan ............ 297/215.11 X |
| 4,125,285 A | 11/1978 | Hanagan ............ 297/215.11 X |
| 4,451,083 A | 5/1984 | Marchello ............... 297/214 X |
| 4,688,509 A | 8/1987 | Nishida ................ 297/195.1 X |
| 4,691,963 A | 9/1987 | Mikuniya et al. ... 297/452.48 X |
| 4,779,695 A | 10/1988 | Yasui |
| 4,779,924 A | 10/1988 | Rudel ................. 297/195.13 X |
| 4,925,513 A | 5/1990 | Witzke et al. ...... 297/452.61 X |
| 5,040,632 A | 8/1991 | Fujii et al. ........... 297/195.1 X |
| 5,088,747 A | 2/1992 | Morrision et al. . 297/DIG. 6 X |
| 5,165,754 A | 11/1992 | Louys ........................ 297/391 |
| 5,190,350 A | 3/1993 | Hwang et al. ..... 297/DIG. 1 X |
| 5,533,783 A | 7/1996 | Harms et al. .......... 297/195.13 |
| 5,639,145 A | 6/1997 | Alderman .............. 297/452.45 |
| 5,675,853 A | 10/1997 | Linge ............................. 5/655 |
| 5,713,630 A | 2/1998 | Kvalvik ...................... 297/254 |
| 5,720,518 A | 2/1998 | Harrison ..................... 297/214 |
| 5,722,729 A | 3/1998 | Carilli ............... 297/DIG. 1 X |
| 5,735,229 A | 4/1998 | House et al. ........ 297/217.1 X |
| 5,802,642 A | 9/1998 | Slaughter ....................... 5/656 |
| 5,944,380 A | * 8/1999 | Atherley ................... 297/195.1 |
| 6,086,149 A | * 7/2000 | Atherley .................. 297/195.1 |

FOREIGN PATENT DOCUMENTS

| | | | |
|---|---|---|---|
| JP | 4-331676 A | 11/1992 | ............. 297/195.13 |
| SU | 1507-637 A | 9/1989 | ................. 297/214 |

* cited by examiner

*Primary Examiner*—Peter M. Cuomo
*Assistant Examiner*—Rodney B. White
(74) *Attorney, Agent, or Firm*—Thorpe North & Western

(57) ABSTRACT

A snowmobile seat includes first and second fasteners to mount a base section on a snowmobile. The first and second fasteners may include hook-and-loop type fasteners and snap type fasteners coupled between the base section and the snowmobile. The hook-and-loop type fasteners are coupled between the base section and the snowmobile to resist horizontal movement between the base section and the snowmobile, and to maintain a connection between the snap type fasteners. The snap type fasteners are coupled between the base section and the snowmobile to resist vertical movement between the base section and the snowmobile, and to maintain a connection between the hook-and-loop type fasteners. The seat also may include a space defining an air chamber formed between a seat section and the base section. The seat section displaces into the air chamber as the user sits on the seat to provide additional cushioning.

23 Claims, 8 Drawing Sheets

LIGHT-WEIGHT SNOWMOBILE SEAT

This application is a continuation-in-part of Ser. No. 09/358,179, now U.S. Pat. No. 6,086,149, filed Jul. 20, 1999, which is a continuation-in-part of Ser. No. 08/948,691, now U.S. Pat. No. 5,944,380, filed Oct. 10, 1997.

BACKGROUND OF THE INVENTION

1. Field of the Invention

The present invention relates to a snowmobile seat. More particularly, the present invention relates to a snowmobile seat including first and second fasteners, such as hook-and-loop and snap type fasteners, working synergistically to attach the seat to a snowmobile. In addition, the present invention relates to a snowmobile seat with an open cell seat section supported by a closed cell base section.

2. Prior Art

Most snowmobiles require a cushioned seat for the rider to sit on for comfort, as well as safety. For many of these snowmobiles, weight is also an issue, and any reduction in weight is significant. For example, additional weight on a snowmobile adds to the problem of the track sinking into the snow and stalling the snowmobile. The added weight also reduces fuel efficiency and reduces speed, an issue for racing snowmobiles.

Traditional seats have a rigid base of metal or plastic. The base is covered in a softer padding. The padding and base are covered with a covering to keep the padding fixed to the base and to keep the padding from coming apart. These seats are typically formed as a unitary part that is bolted to the snowmobile frame.

One problem with the traditional seats is the significant weight. The metal or plastic base is particularly heavy. The typical snowmobile base weighs approximately six pounds, while the entire seat weighs approximately 15 to 18 pounds.

Another problem with the traditional seats is that they absorb moisture. While the covers are sometimes water-resistant, moisture still seeps in through the seams. The covers are also easily ripped, also allowing moisture to enter. The cushions are typically made with an open-cell foam that absorbs water. The cushion tends to act like a giant sponge, soaking up water and increasing the weight of the seat. Absorbed moisture also effects the performance of the cushion. Moisture not only causes the foam to deteriorate, but a cold and wet seat is uncomfortable and may later freeze, making the seat dangerously hard.

Another problem with the traditional seats is that the cover is formed permanently with the base and cushion. Thus, the cover cannot be removed for cleaning. Another problem is that the typical covers are designed to prevent moisture from entering the seat, so they also tend to prevent the seat from drying once the seat has absorbed moisture, thus causing the seat to rot.

A further problem with the traditional seats is that they bolt or otherwise attach to the frame of the snowmobile. Many snowmobiles locate critical parts, such as batteries, engines, and fuel tanks, under the seat. The bolts make the seat difficult and time consuming to remove, as well as adding weight. In addition, tools must be carried, adding weight.

OBJECTS AND SUMMARY OF THE INVENTION

It has been recognized that it would be advantageous to develop a snowmobile seat that is light-weight, comfortable and soft, absorbs shocks, resists absorbing and retaining water, and dries quickly. In addition, it has been recognized that it should be advantageous to develop a snowmobile seat that is removably secured to the snowmobile, is easily secured and removed, and remains fixed to the snowmobile and resists shifting..

The invention provides a snowmobile seat with first and second fasteners, such as hook-and-loop and snap type fasteners, which operate synergistically to removably secure the seat to the snowmobile. The seat includes a base section for mounting on the snowmobile, and may include a cover covering at least a portion.of the base section.

The first fastener is coupled to the base section and engages vertically and resists horizontal movement. For example, hook-and-loop type fasteners may be coupled to the lower surface of the base section or cover, between the base section and the snowmobile. The second fastener is coupled to the base section to engage horizontally and resist vertical movement. For example, snap type fasteners may be coupled to the base section or cover. The first fasteners, or hook-and-loop type fasteners, maintain a connection between the second fasteners, or snap type fasteners. Similarly, the second fasteners, or snap type fasteners, maintain a connection between the first fasteners, or hook-and-loop type fasteners. The snap type fasteners may be disposed on a tab of the cover extending generally vertically away from the base section.

In accordance with another aspect of the invention, a space may be disposed between the base section and a seat section to define an air chamber. The seat section can deflect between (i) a first position in which the seat section is substantially undeflected and defines the air chamber, and (ii) a second position in which the seat section deflects into the air chamber.

In accordance with another aspect of the present invention, an air passage extends from the air chamber.

In accordance with another aspect of the present invention, the base section may be generally rigid with a closed-cell structure, while the seat section is generally flexible with an open-cell structure.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1:
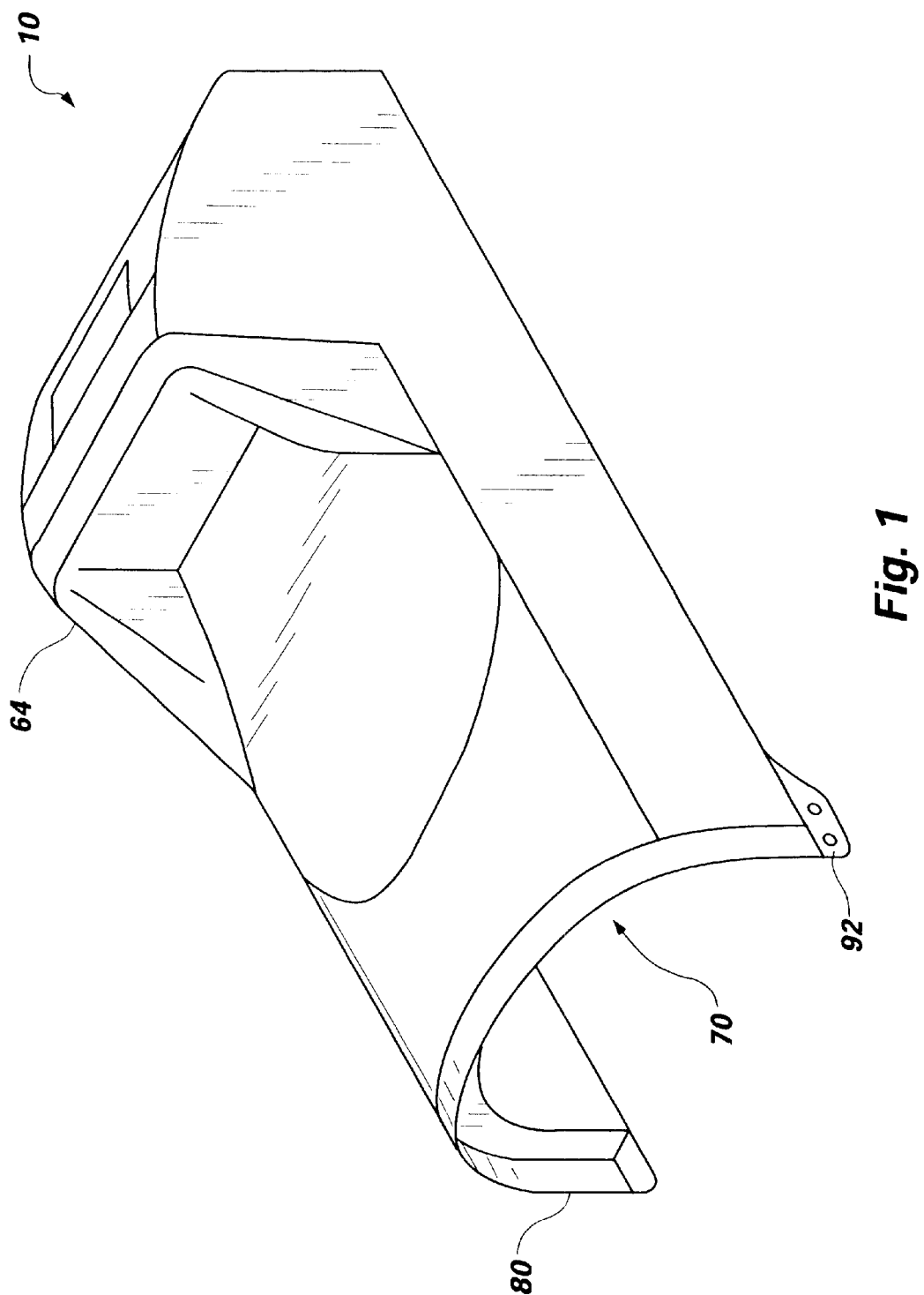
FIG. 1 is a perspective view of a preferred embodiment of the snowmobile seat of the present invention.
Figure 2:
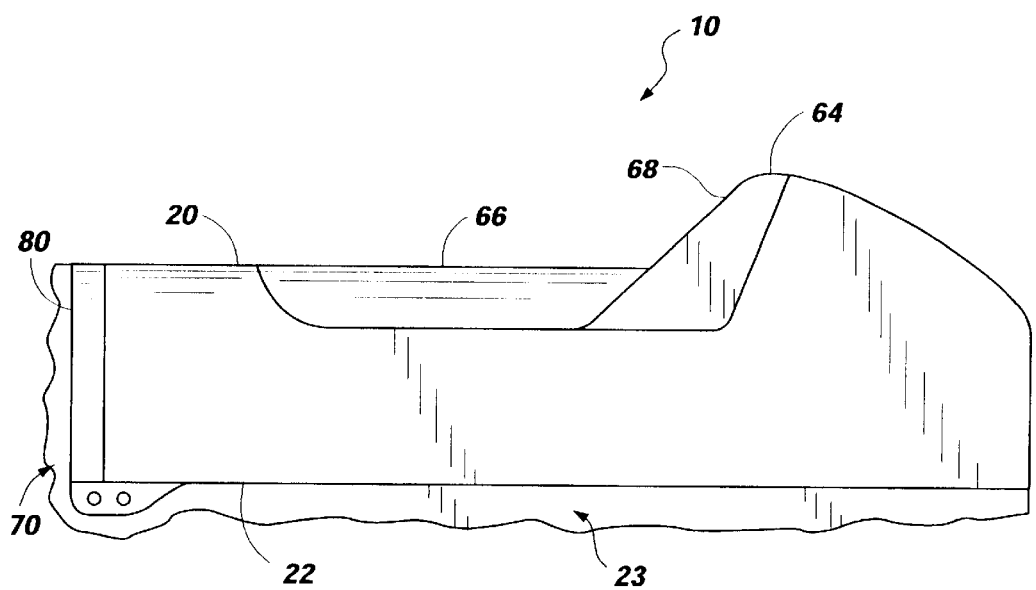
FIG. 2 is a side elevational view of a preferred embodiment of the snowmobile seat of the present invention.
Figure 3:
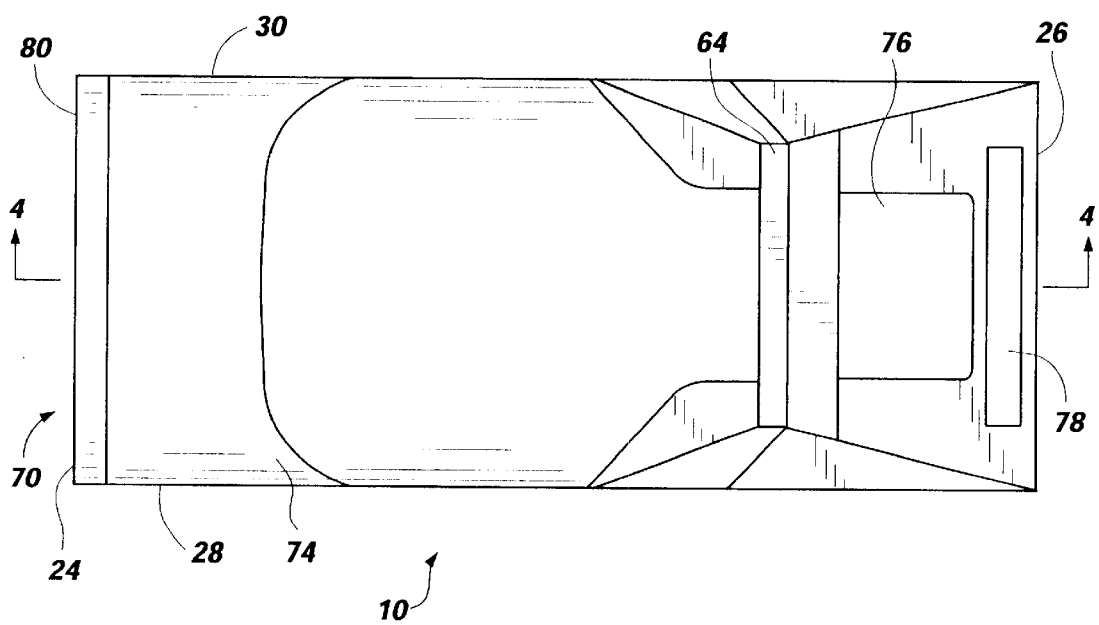
FIG. 3 is a top view of a preferred embodiment of the snowmobile seat of the present invention.

As illustrated in FIGS. 1–3, a preferred embodiment of a snowmobile seat 10 of the present invention is shown. Referring to FIG. 2, the snowmobile seat 10 has an upper surface 20 and a bottom 22. The upper surface 20 provides a seat for the rider to sit on. The bottom 22 is disposed on, or directly or indirectly mounted on, a snowmobile, indicated generally at 23. Referring to FIG. 3, the seat 10, as configured for use on a snowmobile, has a front 24, a back 26, a left side 28 (or first lateral side) and a right side 30 (or a second lateral side). The front 24, like the bottom 22, abuts the snowmobile 23. The back 26 may form a portion of the rear of the snowmobile 23. The front 24, back 26, and left and right sides 28 and 30 preferably mate with the snowmobile 23 in an aesthetically pleasing manner, thus blending with the design and lines of the snowmobile 23.

Figure 4:
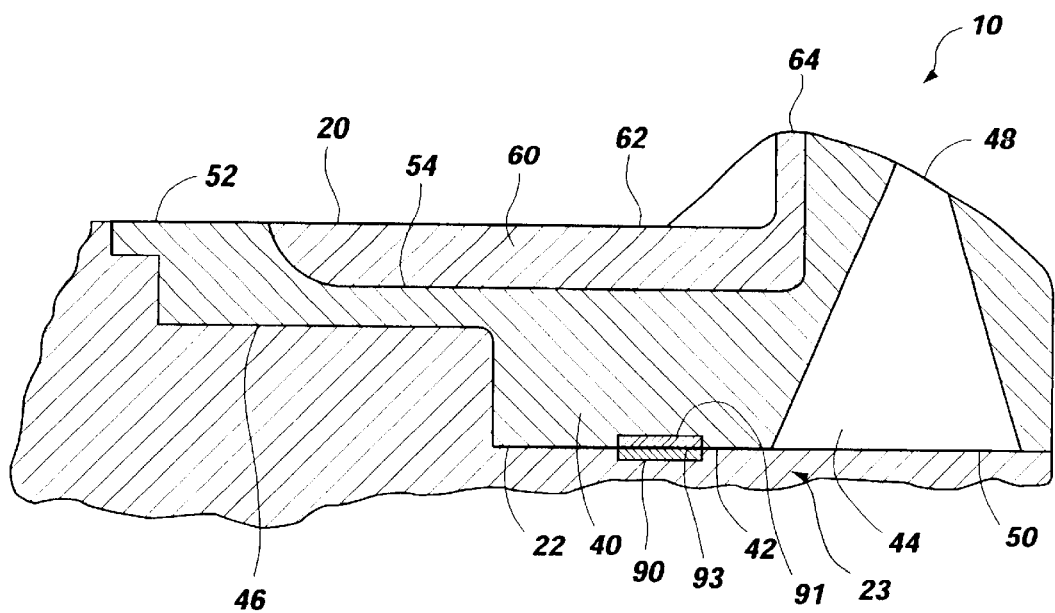
FIG. 4 is a cross section view of a preferred embodiment of the snowmobile seat of the present invention taken along line 4—4 of FIG. 3.

As illustrated in FIG. 4, the snowmobile seat 10 has a base section 40. The base section 40 is substantially rigid and provides support for the seat 10. The base section 40 advantageously has a closed-cell structure that is substantially light weight. The closed cell structure has cell walls and cell voids. The cell walls provide strength and rigidity while the cell voids reduce weight. In addition, the base section 40 does not absorb moisture and water because of the closed cells. The base section 40 is preferably made of a closed-cell foam.

A snowmobile seat 10 configured as shown for a snowmobile has a total weight of approximately 4 to 6 pounds. Prior art snowmobile seats weigh approximately 15 to 18 pounds. In addition, a snowmobile seat configured as shown for a snowmobile absorbs approximately 90% less water. The closed-cell base section 40 is a significant improvement over prior art seats utilizing metal or plastic frames and open cell foam cushioning because the closed-cell structure forms a substantially. rigid base without adding weight or absorbing water.

The closed-cell structure also acts as a temperature insulator, protecting the rider from heat generated by the snowmobile and/or cold weather. The closed-cell structure also helps muffle engine noise produced by the snowmobile.

The base section 40 has a lower surface 42 that forms at least part of the bottom 22, and which is directly or indirectly mounted on the snowmobile 23. A utility cavity 44 may be formed in the base section 40 for holding various items, such as gloves, tools, food, water bottles, a first aid kit, etc. The utility cavity 44 may be a general cube or pyramid shape or may be configured for the specific item to be carried. Again, the closed-cell structure defining the cavity also provides insulation to maintain the temperature of the item carried. Thus, the closed-cell structure may help keep coffee hot on snowmobile treks. An access opening 48 is formed in the seat 10 to provide access to the utility cavity 44. The cavity 44 may be left open to the snowmobile, shown at 50, so that heat generated by the snowmobile may be used to maintain the temperature of the items contained in the cavity, such as coffee or tools. Additional cavities 46 are formed in the base section 40 so that the seat 10 fits around various snowmobile components, such as a gas tank, an engine, a battery, etc.

The base section 40 also has an upper surface 52. The upper surface 52 preferably has an indentation 54 formed therein for receiving a cushioned seat as discussed in more detail below. The upper surface 52 of the base section 40 may also form part of the upper surface 20 of the seat 10.

The snowmobile seat 10 has a seat section 60. The seat section is preferably disposed in the indentation 54 formed in the base section 40. The seat section 60 has an upper surface 62 on which a rider may sit. The seat section 60 is flexible and provides a cushioned seat for the rider. The seat section 60 is preferably open-cell foam.

Alternatively, the base section 40 may have an upper surface 52 without an indentation and upon which the seat section 60 is disposed. The seat section 60 may cover the entire upper surface 52 of the base section 40, thus providing an elongated, cushioned seat for multiple riders.

Although the base section 40 has a closed-cell structure that is substantially rigid, it also has some flexibility that provides some cushioning effect. Therefore, the flexible seat section 60 need not be as thick as required for the prior art metal or plastic base frames.

Referring to FIG. 2, the base section 40 and seat section 60 may be configured to form a back support 64. The seat section 60 may have a central portion 66 and a back support portion 68 formed rearwardly of the central portion.

Referring again to FIGS. 1–3, the. snowmobile. seat 10 has a cover 70. The cover 70 preferably extends over most of the base section 40 and seat section 60. The cover 70 may be formed of any 20 suitable material or combination of materials. In addition, the cover is preferably strong enough to resist tears or punctures and is also preferably waterproof or water resistant to prevent moisture from seeping into the seat section. The cover is preferably canvas covering most of the base section and vinyl covering the seat section.

Figure 6:
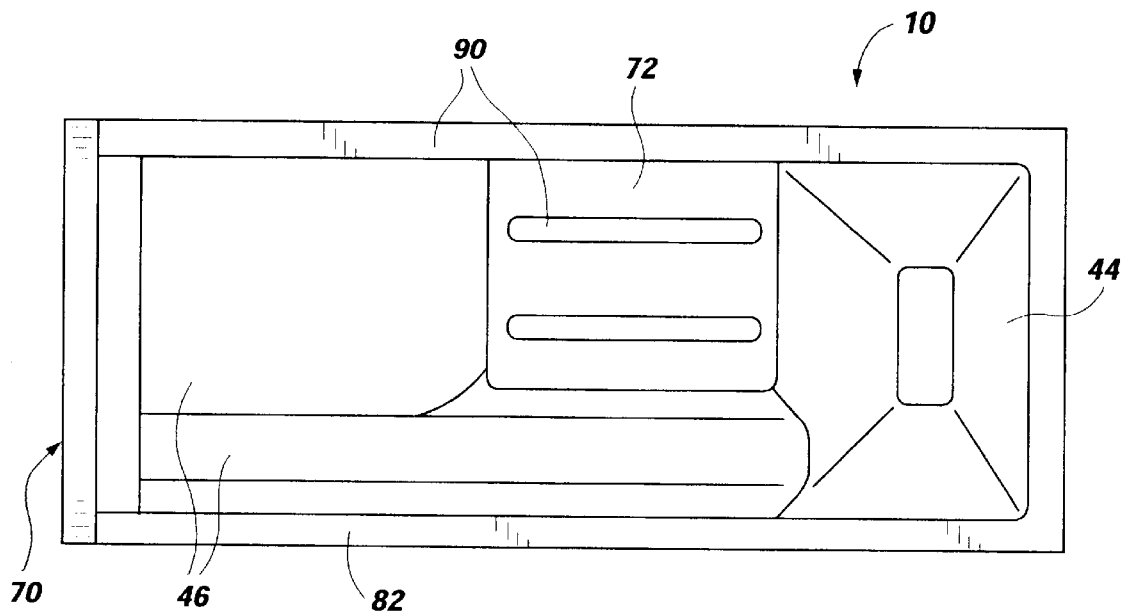
FIG. 6 is a bottom view of a preferred embodiment of the snowmobile seat of the present invention.

In addition, the cover is advantageously removable. Thus, it can be removed for washing or repair. The cover may be comprised of various pieces or sections coupled together in order to cover the desired portion of the seat. For example, the cover 70 may have a lower seat cover 72, as shown in FIG. 6, and an upper seat cover 74, as shown in FIG. 3. The lower seat cover 72 covers any desired portion of the lower surface of the base member 40 while the upper seat cover 74 covers the seat section 60. and desired portions of the base section.

Referring to FIG. 3, the upper seat cover 74 has a flap 76 pivotally disposed over the access opening 48 to the utility cavity 44. The flap 76 may have one edge sewn into the cover 70 about which the flap pivots in order to open and close. The flap may be held closed by a hook-and-loop type fastener, a snap type faster or a zipper. The seat 10 may also have a reflector 78 which is preferably sewn into the cover 70. Alternatively, the upper seat cover 74 may have an aperture with a zipper formed therein and disposed over the access opening 48 to the.utility cavity, as shown in FIG. 9b.

The cover 70 may also have a sleeve 80 formed therein for overlapping, or otherwise mating with, a portion of the snowmobile, as shown in FIGS. 1–3. The sleeve 80 prevents moisture or dirt from getting in between the seat 10 and the snowmobile and into snowmobile parts.

The seat 10 is preferably attached to the snowmobile by hook-and-loop type fasteners, shown at 90 in FIG. 6, and snap type fasteners, shown at 92 in FIG. 1. This allows the seat to be removed from the snowmobile for service. Referring to FIG. 6, the fasteners 90 are preferably located about the periphery of the lower surface 22 and on any part of the lower surface 42 of the base section 40 which contacts the snowmobile. Referring to FIG. 4, one portion 91, such as the hook portion, may be disposed on the lower surface 42 of the base section 40, while the other portion 93, such as the loop portion, may be disposed on the snowmobile 23. The hook-and-loop type fasteners 90 and snap type fasteners 92 work synergistically to attach the seat 10 to the snowmobile 23. The hook-and-loop type fasteners 90 engage vertically and resist horizontal movement of the seat with respect to the snowmobile. The snap type fasteners 92 engage horizontally and resist vertical movement of the seat 10 with respect to the snowmobile 23. The snap type fasteners 92 maintain the connection of the hook-and-loop type fasteners 90 by resisting vertical movement, which causes the hook-and-loop type fasteners 90 to engage and disengage. Likewise, the hook-and-loop type fasteners 92 maintain the connection of the snap type fasteners 90 by resisting horizontal movement, which causes the snap type fasteners 92 to engage and disengage.

Figure 5:
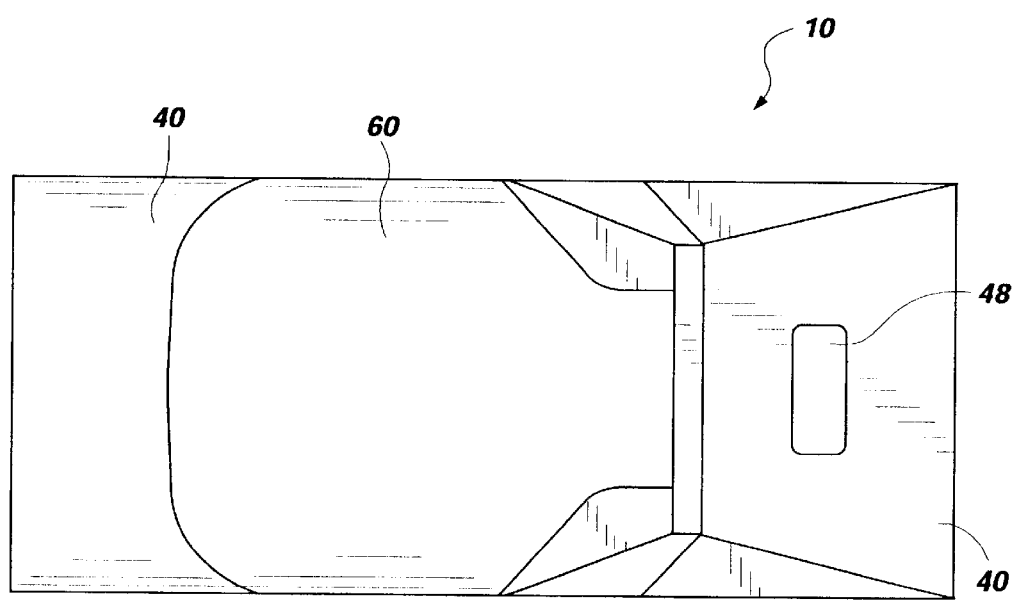
FIG. 5 is a top view of a preferred embodiment of a snowmobile seat of the present invention with the cover removed.

Referring again to FIG. 6, the cover 70 preferably has a tab 82 formed about the periphery of the upper seat cover 74 and extends under the base section 40. The tab 82 may have hook-and-loop fasteners 90 on one side to couple to the lower seat cover 72 and on the other side to attach the cover 70 and seat to to the snowmobile. In this manner, the weight of the rider is utilized to maintain the hook-and-loop fasteners 90. The seat 10 is shown with the cover 70 in FIG. 3 and without the cover 70 in FIG. 5. The upper and lower seat covers 72 and 74 may be coupled by any suitable means, including hook-and-loop type fasteners, snap type fasteners, zippers, etc.

The hook-and-loop type fasteners are preferred as they make installing the seat on an existing snowmobile easier. For example, the loop portion of the fastener may be sewn into the cover while the hook portion of the fastener is provided with an adhesive backing. With the hook portion fastened to the loop portion, the adhesive backing on the hook portion may be exposed and the seat then positioned on the snowmobile, easily locating the hook portion of the fastener on the snowmobile.

Figure 7:
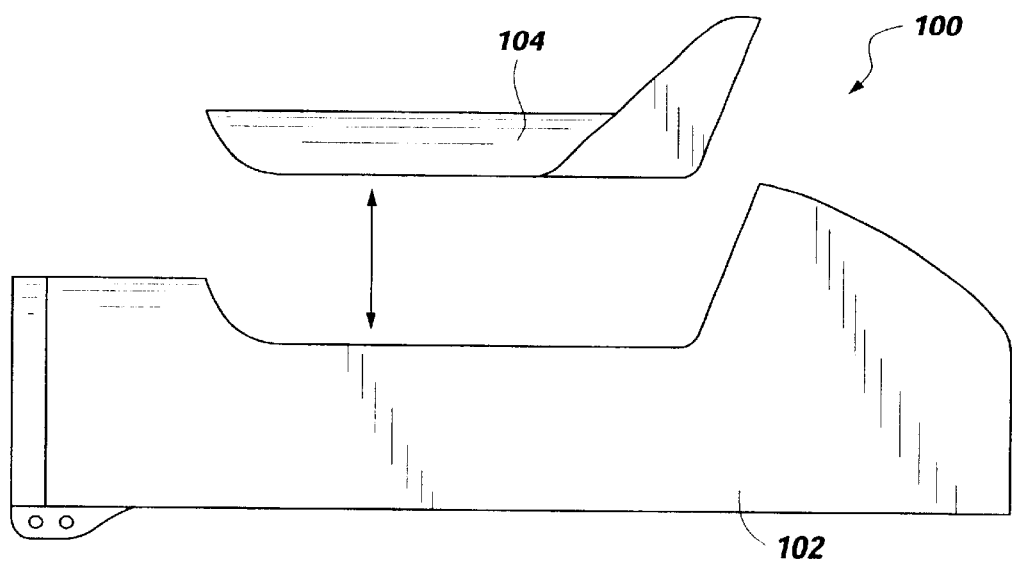
FIG. 7 is a side elevational view of an alternative embodiment of the snowmobile seat of the present invention.

As illustrated in FIG. 7, an alternative embodiment of the snowmobile seat 100 is shown. The seat 100 has a base section 102 and a seat section 104 removably disposed on the base section. The seat section 104 may be attached to the base section 102 with hook-and-loop type fasteners. Seat sections of various densities of open-cell foam may be provided such that the seats have varying degrees of flexibility. Thus, riders of various weight may select a seat section 104 of appropriate flexibility to suit their comfort.

Figure 8:
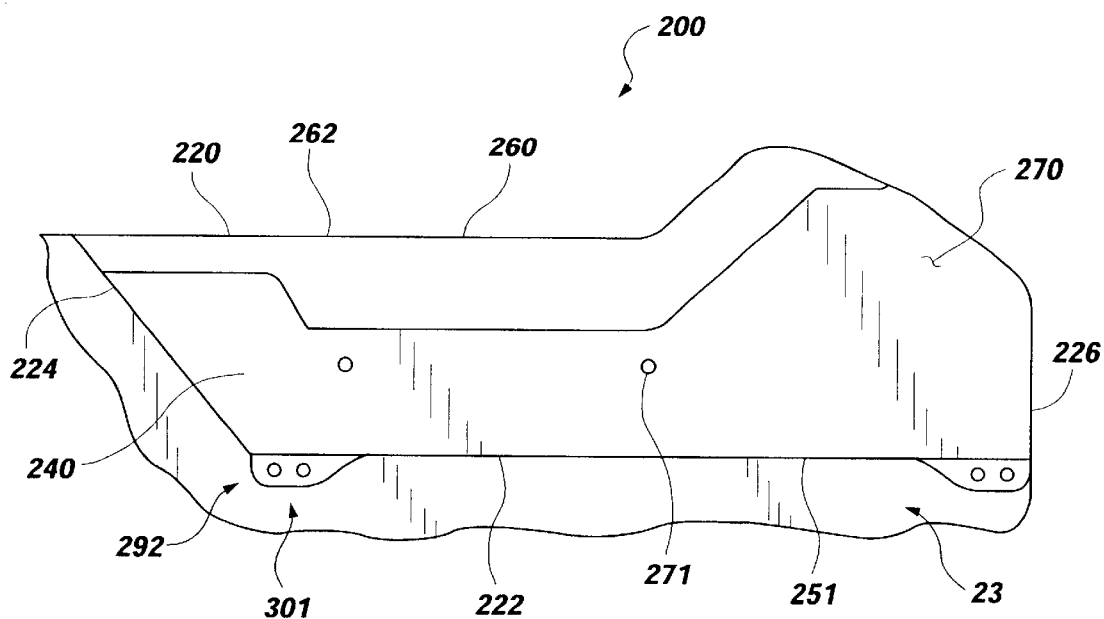
FIG. 8 is a side elevational view of an alternative embodiment of the snowmobile seat of the present invention.

As illustrated in FIG. 8, an alternative embodiment of the snowmobile seat, indicated generally at 200, is shown disposed on the snowmobile 23. Referring to FIGS. 8–10, the snowmobile seat 200 has an upper surface 220 for the rider to sit on, and a bottom 222 disposed on the snowmobile 23. The seat 200 has a front side 224, a back side 226, a left side 228 (or first lateral side) and a right side 230 (or a second lateral side).

As illustrated in FIG. 10, the snowmobile seat 200 has a base section 240, which is substantially rigid and provides support for the seat 200. The base section 240 advantageously has a closed THORPE, cell structure with cell walls and cell voids that is substantially light weight. The cell walls provide strength and rigidity while the cell voids reduce weight. The base section 240 is preferably made of a closed-cell foam.

The base section 240 has a lower surface 242 that forms at least part of the bottom 222. The lower surface 242 of the base section 240 is disposed on or over an upper surface 251 of the snowmobile 23. It is of course understood that the seat 200 or base section 240 can be directly or indirectly attached to the upper surface 251 of the snowmobile 23. The base section 240 also has an upper surface 252. The upper surface 252 of the base section 240 advantageously has a cavity 254 formed therein.

The snowmobile seat 200 also has a seat section 260 with a lower surface 261 disposed on the base section 240, or the upper surface 252 of the base section. The seat section 260 also has an upper surface 262 on which a rider may sit. The seat section 260 is flexible and provides a cushioned seat for the rider. In addition, the seat section 260 is formed of a material which compresses and deflects under force, as discussed more fully below. The seat section 260 is preferably open-cell. foam. The lower surface 261 of the seat section 260 advantageously has a cavity formed therein 263.

A space 265 advantageously is disposed between the lower surface 242 of the base section 240 and the upper surface 262 of the seat section 260 defining an air chamber. Preferably, the space 265 is formed between the base section 240 and the seat section 260, as shown. The space or air chamber 265 provides additional cushioning for the rider. In addition, the air chamber 265 provides improved shock absorbing capabilities. As the rider is forced into the seat, such as by falling into the seat or by hitting a bump with the snowmobile, the seat cushion 260 not only compresses, but displaces and/or deflects into the space.265. The space 265 may be formed by the cavity 254 in the base section 240 and/or the cavity 263 in the seat section 260.

Figure 9A:
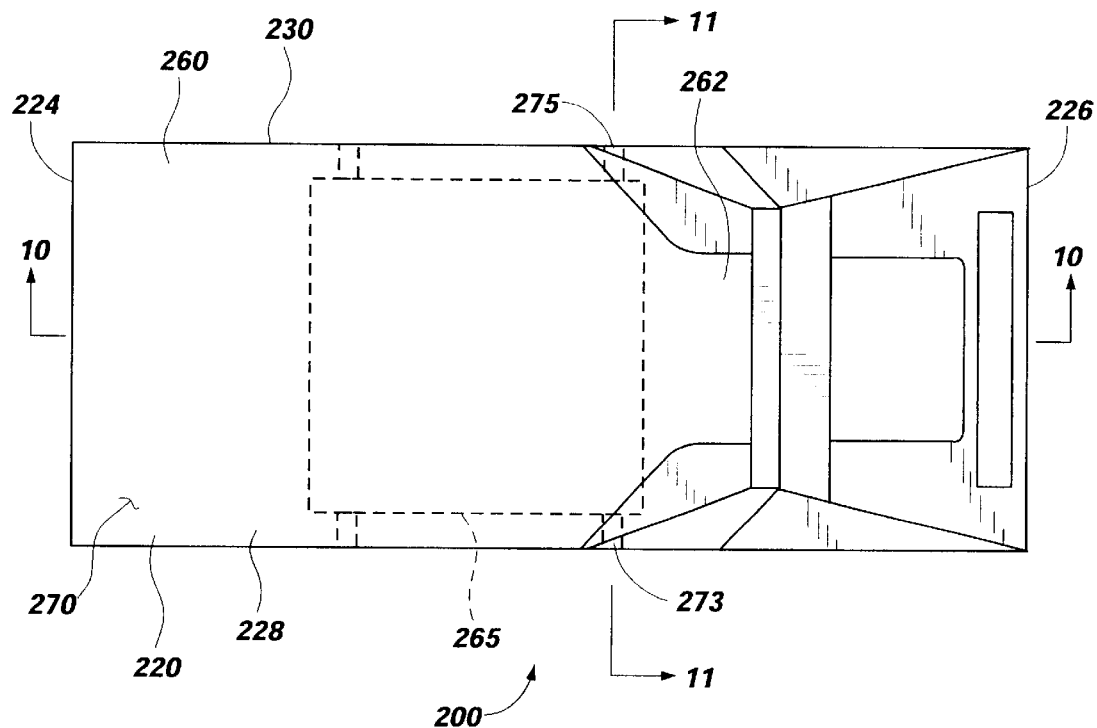
FIG. 9a is a top view of an alternative embodiment of the snowmobile seat of the; present invention.
Figure 9B:
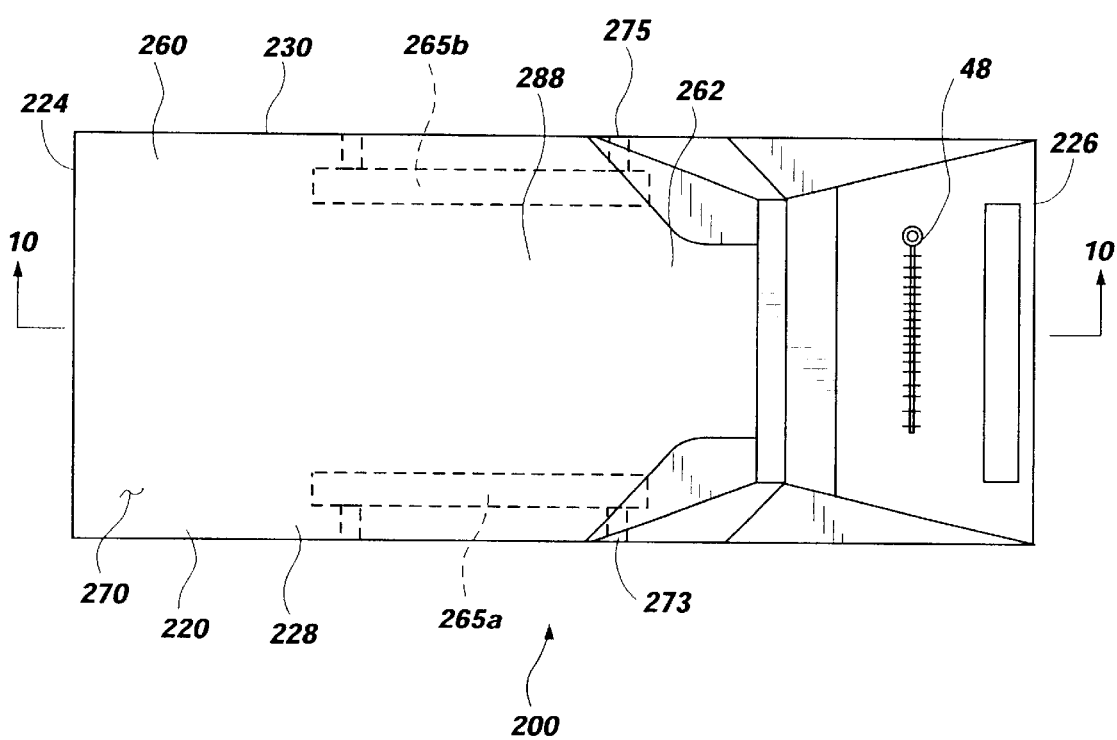
FIG. 9b is a top view of an alternative embodiment of the snowmobile seat of the present invention.
Figure 10:
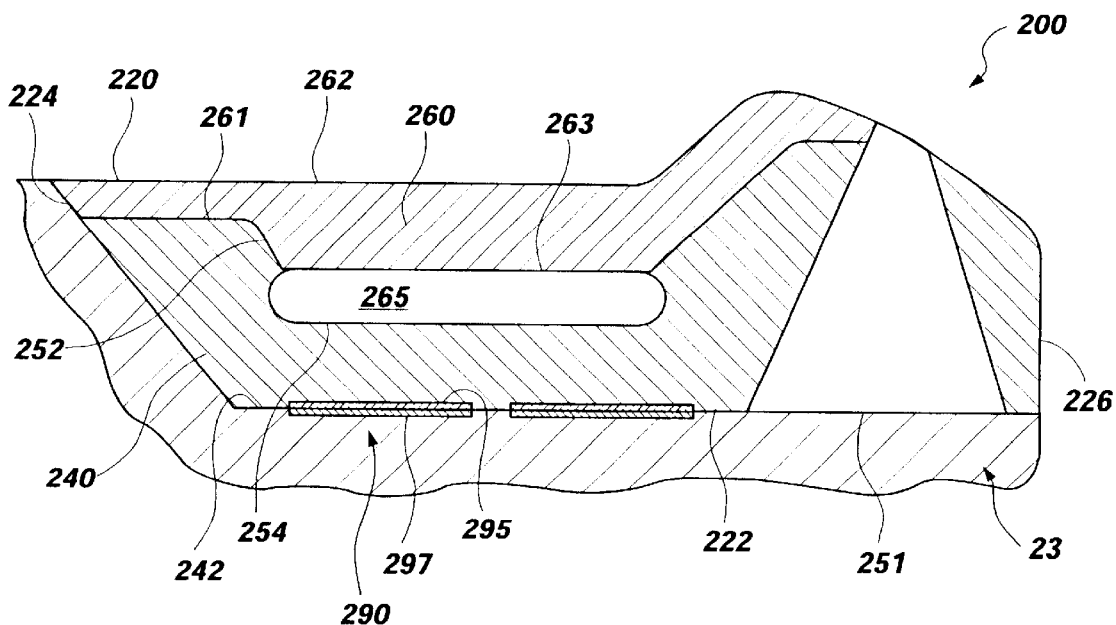
FIG. 10 is a cross sectional side view of an alternative embodiment of the snowmobile seat of the present invention, taken along line 10—10 of FIG. 9.

Referring to FIGS. 8 and 9a, the base and seat sections 240 and 260 have an exterior surface which preferably is covered by a cover 270. Thus, the cover 270 preferably extends over most of the base section 240 and seat section 260. In addition, the cover 270 may entirely cover and enclose the base and seat sections 240 and 260. Referring to FIG. 8, the cover 270 has one or more air holes 271 formed in the cover 270 for allowing air to pass into and out of the cover, as discussed more fully below.

Figure 11:
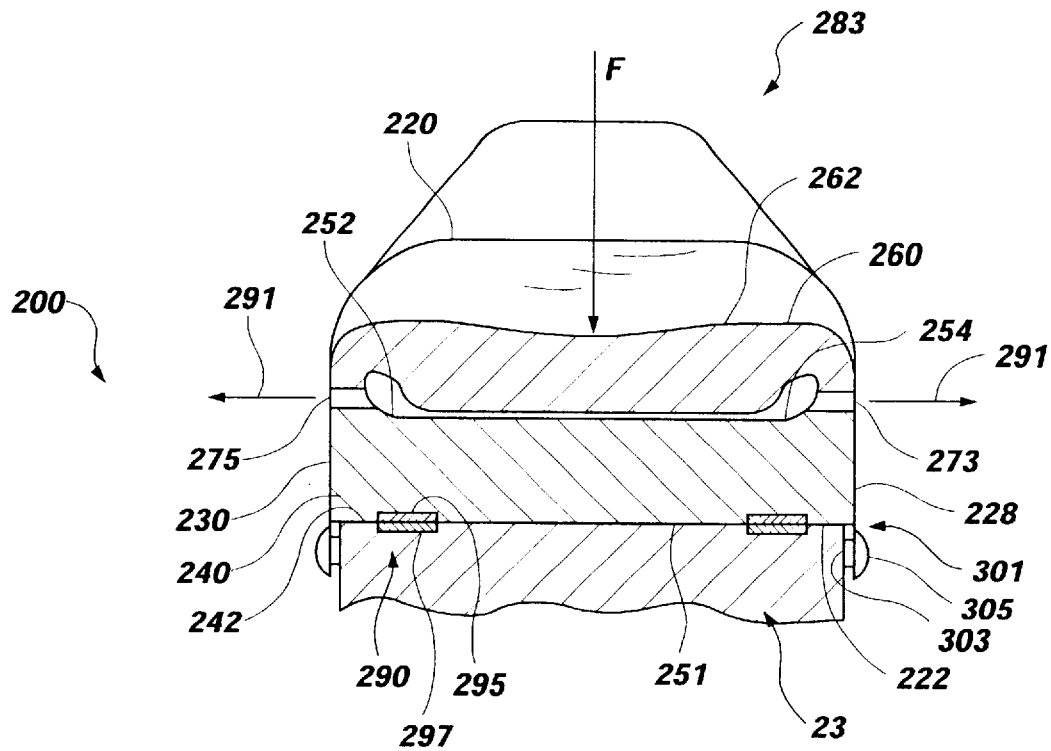
FIG. 11 is a cross sectional end view of an alternative embodiment of the snowmobile seat of the present invention, taken along line 11—11 of FIG. 9.
Figure 12:
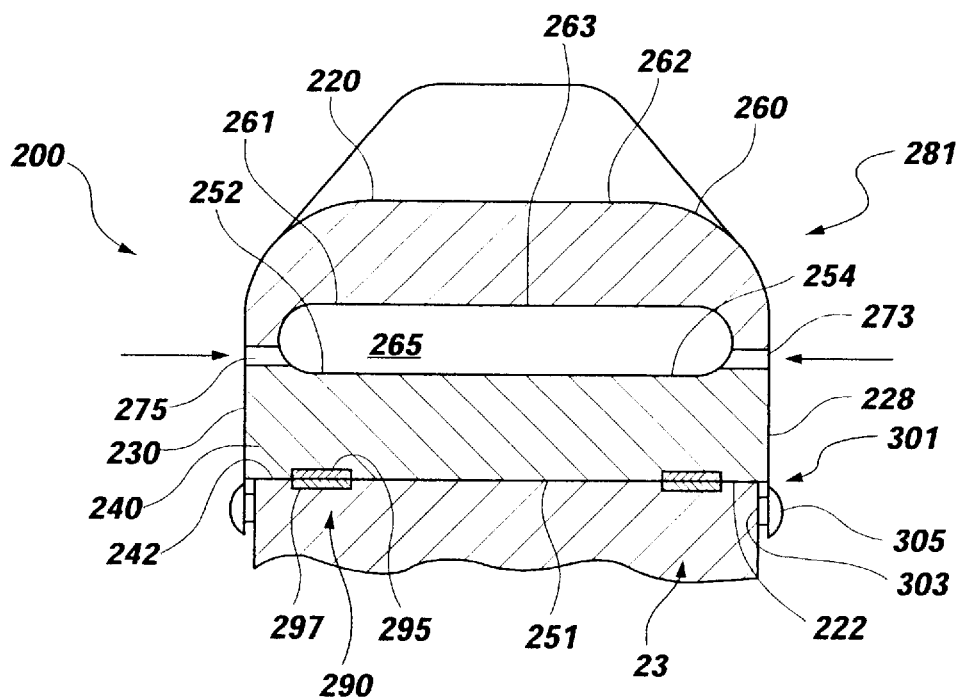
FIG. 12 is a cross sectional end view of an alternative embodiment of the snowmobile seat of the present invention, taken along line 11—11 of FIG. 9.

Referring to FIGS. 9a, 11 and 12, one or more air passages 273 and 275 advantageously extend from the air chamber 265 to the exterior of the seat 200. The air passages 273 and 275 preferably extend from the air chamber 265 to the lateral sides 228 and 230 of the seat 200, and to the air holes 271 (FIG. 8) in the cover 270. Preferably, the air holes 271 (FIG. 8) are formed, and the air passages 273 and 275 terminate, at the sides 228 and 230 of the seat 200 because holes located in other areas are more likely to become.clogged or blocked. For example, holes at the back 226 of the seat 200 are likely to become clogged with snow kicked up by the snowmobile. In addition, holes at the top of the seat may be covered by a rider. Furthermore, air passages 273 and 275 extending to the sides 228 and 230 will most likely represent the shortest path from the air chamber 265 to the outside, or be shorter than air passages to other sides of the seat.

Referring again to FIGS. 11 and 12, the flexible seat section 260 deflects and/or displaces between a first position 281, as shown in FIG. 12, and a second position 283, as shown in FIG. 11. Referring to FIG. 12, in the first position 281, the seat section 260 is substantially undeflected, and defines the air chamber 265. The seat section 260 is in an unstressed, unloaded, position. Although the seat section 260 is flexible and compressible, it has enough rigidity to hold its form and remain suspended over the air chamber 265.

Referring to FIG. 11, in the second position 283, the seat section 260 deflects and/or displaces into the air chamber 265 under a force, indicated by the arrow F, such as the rider's weight. As the seat section 260 deflects into the air chamber 265, air in the chamber 265 is forced out of the chamber 265, through the air passages 273 and 275, and out the air openings 271 (FIG. 8) in the cover 270, as indicated by arrows 291. As indicated above, the air chamber 265 provides additional cushioning and shock absorption for the rider. Not only does the seat section 260 compress under the rider's weight, but the seat section 260 deflects into the air chamber 265.

Referring again to FIG. 12, as the seat section 260 returns to the first position 281, a vacuum is created in the air chamber 265 drawing air from the outside in through the air holes 271 (FIG. 8) in the cover 270, through the air passages 273 and 275, and into the air chamber 265. Even though the seat 200, or base and seat sections 240 and 260, is covered by the cover 270 which is preferably waterproof or water resistant, water or moisture will eventually seep through the cover 270, or seams in the cover, and into the base and seat sections 240 and 260. One disadvantage with prior art seats is that their covers tend to retain moisture in the seat. The moisture tends to rot and deteriorate the seat, and is uncomfortable for the rider.

The seat 200 of the present invention advantageously takes advantage of the cyclical up and down motion of the rider. For example, as the snowmobile 23 travels over bumps, the rider is displaced up and down with respect to the snowmobile and the seat. In addition, many snowmobiles are used in situations in which the rider repeatedly sits and stands while riding. As the rider moves up and down, or stands and sits, the seat section 260 is repeatedly deflected .between the first and second position 281 and 283. As the seat section 260 deflects, air is repeatedly drawn into the air chamber 265 and expelled from the air chamber 265, thus circulating air through the seat 200. The circulating air helps keep the seat 200 dry.

One disadvantage with some prior art seats is that they have covers which trap air within the cover, and thus the seat. As a rider sits on, or is forced against, the prior art seat, air in the seat is prevented from escaping, thus reducing the cushioning effect, or shock absorption, of the seat. The air holes 271 (FIG. 8) of the seat 200 of the present invention allow air to exit the cover 270, and the seat 200. In addition, the air holes 271 (FIG. 8) provide a restriction which limits the rate of escaping air. Thus, the size of the air holes 271 (FIG. 8) may be controlled or adjusted as desired to control and adjust the cushion effect and shock absorbing characteristics of the seat 200. For example, larger air openings will allow the air to escape faster, while smaller air openings will allow the air to escape slower.

Referring to FIG. 9a, the space 265 may be a single continuous space or chamber. Alternatively, referring to FIG. 9b, the space 265 may be a plurality of spaces, such as left and right side chambers 265a and 265b located near the sides of the seat. Thus, the seat has a center support 288 between the left and right side chambers 265a and 265b, and between the seat section and the base section.

Referring to FIGS. 8 and. 10–12, the seat 200 is preferably attached to the snowmobile 23 by hook-and-loop type fasteners, indicated generally at 290, and by snap type fasteners, indicated generally at 292. The hook-and-loop type fasteners 290 and snap type fasteners 292 work synergistically to attach the seat 200 to the snowmobile 23. The hook-and-loop type fasteners 290 engage vertically and resist horizontal movement of the seat with respect to the snowmobile. The snap type fasteners 292 engage horizontally and resist vertical movement of the seat 200 with respect to the snowmobile 23. The snap type fasteners 292 maintain the connection of the hook-and-loop type fasteners 290 by resisting vertical movement, which causes the hook-and-loop type fasteners 290 to engage and disengage. Likewise, the hook-and-loop type fasteners 292 maintain the connection of the snap type fasteners 290 by resisting horizontal movement, which causes the snap type fasteners 292 to engage and disengage.

The hook-and-loop type fasteners 290 are coupled to and between the lower surface 242 of the base section 240 and the upper surface 251 of the snowmobile 23. The hook-and-loop type fasteners 290 may be coupled to a portion of the cover 270 disposed over the lower surface 242 of the base section 240. For example, the hook portion 295 of the hook-and-loop type fasteners 290 may be coupled to the lower surface 242 of the base section 240, or to a portion of the cover 270 disposed over the lower surface 242. Thus, the hook-and-loop type fastener 290 or hook portion 295 are coupled to the base section 240 by the cover 270. The loop portion 297 is coupled to the snowmobile 23. The hook-and-loop type fasteners 290 are engaged, and disengaged vertically. For example, the seat 200 may be coupled to the snowmobile 23 by placing the seat 200 vertically down upon the snowmobile 23, thus engaging the hook-and-loop type fasteners 290. The seat 200 also may be removed from the snowmobile 23 by pulling the seat 200 vertically from the snowmobile 23. Thus, the hook-and-loop type fasteners 290 are disposed in a generally horizontal layer.

The snap type fasteners 292 preferably are coupled to and between the cover 270 and the snowmobile 23. The cover 270 may include tabs, indicated generally at 301. The tab 301 extends generally vertically away from the base section 240 and over the snowmobile 23. A male portion 303 of the snap type fasteners 292 may be coupled to the snowmobile 23. A female portion 305 of the snap type fasteners 292 may be coupled to the tab 301 of the cover 270. Thus, the snap type fasteners 292 or female portion 305 is coupled to the seat 200 or base section 240 by the tab 301 of the cover 270. The snap type fasteners 270 are engaged, and disengaged, horizontally. For example, once the seat 200 is disposed on the snowmobile 23 and the hook-and-loop type fasteners 290 engaged, the snap type fasteners 292 may be engaged by horizontally pressing the female portion 305 against the male portion 303. Thus, the snap type fasteners 292 are disposed in a generally vertical layer.

Preferably, snap type fasteners 292 are located on a plurality of tabs 301 formed at the corners formed between adjacent sides of the base section 240. Thus, each corner of the seat 200 is secured.

Figure 13:
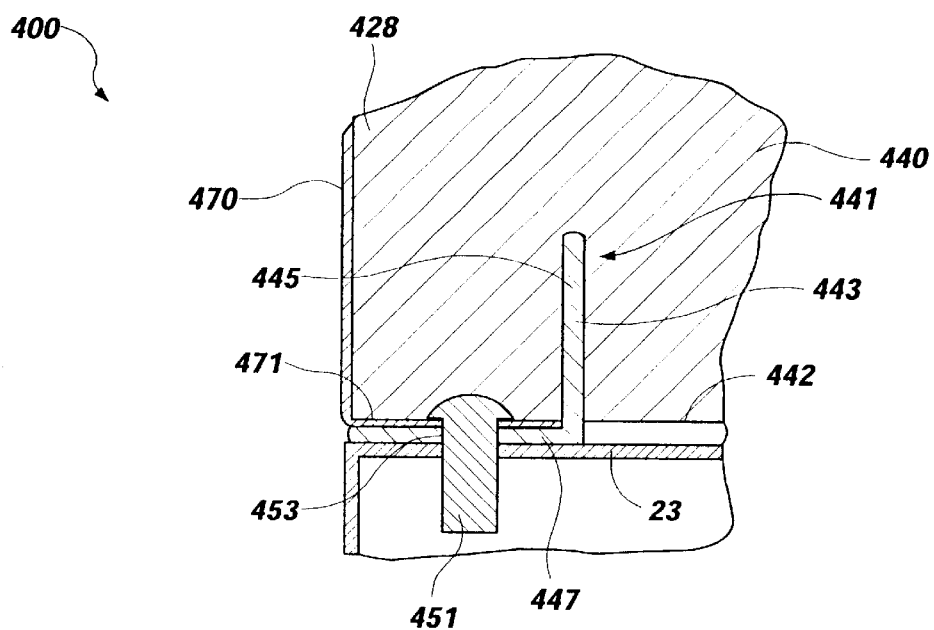
FIG. 13 is a cross sectional detail view of an alternative embodiment of the snowmobile seat of the present invention.

Referring to FIG. 13, a portion of an alternative embodiment of a seat, indicated generally at 400, is shown, namely a cross section of the left side 428 of a lower portion of the base section 440, which is also illustrative of the right side. The base section 440 has a first elongated groove 441 formed in the lower surface 442 spaced from the first, or left, lateral side 428. The base section also has a second elongated groove (not shown) identical to the first groove, but formed on the right side. The first and second elongated grooves preferably extend substantially the length of the seat 400. The seat 400 has a first elongated rail 443 coupled to the base section 440, and a second elongated rail (not shown) identical to the first. The rails preferably extend substantially the length of the seat 400. The rail 443 has a vertical portion 445 extending into the first elongated groove 441. The rail 443 also has a horizontal portion 447 extending transversely from the vertical portion 445. A portion 471 of the cover 470 is disposed on the lower surface 442 of the base section 440 and is secured between the lower surface 442 of the base section 440 and the horizontal portion 447 of the rail 443. A bolt 451 extends through an aperture 453 formed in the horizontal portion 445 of the rail 443 for fastening the rails, and thus the seat 400, to the snowmobile 23. Thus, the seat 400 may be attached with traditional bolts 451.

It is of course understood that other types of fasteners may be used. For example, rivets, screws, bolts, tab-and-eyelet, etc. may be used instead of the snap-type fasteners.

It is to be understood that the described embodiments of the invention are illustrative only, and that modifications thereof may occur to those skilled in the art. Accordingly, this invention is not to be regarded as limited to the embodiments disclosed, but is to be limited only as defined by the appended claims herein.

What is claimed is:

1. A snowmobile seat comprising:
  a base section configured to be mounted on a snowmobile; and
  hook-and-loop type fasteners and snap type fasteners, configured to be coupled between the base section and the snowmobile,
  the hook-and-loop type fasteners being coupled to the base section and configured to be coupled to the snowmobile to resist horizontal movement between the base section and the snowmobile, and to maintain a connection between the snap type fasteners,
  the snap type fasteners being coupled to the base section and configured to be coupled to the snowmobile to resist vertical movement between the base section and the snowmobile, and to maintain a connection between the hook-and-loop type fasteners.

2. The snowmobile seat of claim 1, wherein the hook-and-loop type fasteners are coupled to a lower surface of the base section and disposed in a generally horizontal layer to engage vertically; and wherein the snap type fasteners are coupled to a tab extending generally vertically away from the base section and disposed in a generally vertical layer to engage horizontally.

3. The snowmobile seat of claim 1, further comprising:
  a cover, disposed over at least a portion of the base section; and
  wherein the hook-and-loop type fasteners and the snap type fasteners are to the cover.

4. The snowmobile seat of claim 1, further comprising:
  a cover, disposed over at least a portion of the base section, and having at least one tab extending generally vertically away from the base section; and
  wherein the hook-and-loop type fastener is coupled to a lower portion of the cover, and the snap type fastener is coupled to the at least one tab.

5. The snowmobile seat of claim 1, further comprising:
  a cover, disposed over at least a portion of the base section, and having at least one tab extending generally vertically away from the base section configured to be coupled to a side of the snowmobile.

6. The snowmobile seat of claim 1, further comprising:
  a seat section, disposed on the base section; and
  a space, disposed between the base section and the seat section, defining an air chamber; and
  wherein the flexible seat section deflects between (i) a first position in which the seat section is substantially undeflected and defines the air chamber, and (ii) a second position in which the seat section deflects into the air chamber.

7. A snowmobile seat comprising:
  a base section;
  a first hook-and-loop type fastener, coupled to the base section, configured to engage vertically and resist horizontal movement; and
  a second snap type fastener, coupled to the base section, configured to engage horizontally and resist vertical movement.

8. The snowmobile seat of claim 7, wherein the first hook-and-loop type fastener is disposed in a generally horizontal layer; and wherein the second snap type fastener is coupled to a tab extending generally vertically away from the base section.

9. The snowmobile seat of claim 8, wherein the hook-and-loop type fastener is coupled to a lower surface of the base section and disposed in a generally horizontal layer to engage vertically; and wherein the snap type fastener is disposed in a generally vertical layer to engage horizontally.

10. The snowmobile seat of claim 7, further comprising:
  a cover, disposed over at least a portion of the base section; and
  wherein the first and second fasteners are directly attached to the cover and coupled to the base section by the cover.

11. The snowmobile seat of claim 7, further comprising:
  a cover, disposed over at least a portion of the base section, and having at least one tab extending generally vertically away from the base section; and
  wherein the first hook-and-loop type fastener is directly attached to a lower portion of the cover and coupled to the base section by the cover, and the second snap type fastener is directly attached to the at least one tab and coupled to the base section by the at least one tab of the cover.

12. The snowmobile seat of claim 7, further comprising:
  a seat section, disposed on the base section; and
  a space, disposed between the base section and the seat section, defining an air chamber; and
  wherein the flexible seat section deflects between (i) a first position in which the seat section is substantially undeflected and defines the air chamber, and (ii) a second position in which the seat section deflects into the air chamber.

13. A snowmobile seat comprising:
  a base section; and
  first hook-and-loop type fasteners and second fasteners, configured to be coupled between the base section and the snowmobile,
  the first hook-and-loop type fasteners being coupled to the base section and configured to be coupled to the snowmobile to resist horizontal movement between the base section and the snowmobile, and to maintain a connection between the second fasteners, the second fasteners being coupled to the base section and configured to be coupled to the snowmobile to resist vertical movement between the base section and the snowmobile, and to maintain a connection between the first hook-and-loop type fasteners.

14. The snowmobile seat of claim 13, wherein the first hook-and-loop type fasteners are disposed in a generally horizontal layer; and wherein the second fasteners include snap type fasteners, coupled to a tab extending generally vertically away from the base section.

15. The snowmobile seat of claim 14, wherein the hook-and-loop type fasteners are coupled to a lower surface of the base section and disposed in a generally horizontal layer to engage vertically; and wherein the snap type fasteners are disposed in a generally vertical layer to engage horizontally.

16. The snowmobile seat of claim 13, further comprising:

a cover, disposed over at least a portion of the base section; and wherein the first hook-and loop type fasteners and the second fasteners are coupled to the cover.

17. The snowmobile seat of claim 13, further comprising:

a cover, disposed over at least a portion of the base section, and having at least one tab extending generally vertically away from the base section; and wherein the first hook-and-loop type fasteners are coupled to a lower portion of the cover, and the second fasteners are coupled to the at least one tab.

18. The snowmobile seat of claim 13, further comprising:

a seat section, disposed on the base section; and a space, disposed between the base section and the seat section, defining an air chamber; and wherein the flexible seat section deflects between (i) a first position in which the seat section is substantially undeflected and defines the air chamber, and (ii) a second position in which the seat section deflects into the air chamber.

19. A snowmobile seat comprising:

a generally rigid base section;

a flexible seat section, disposed on the base section;

a space, disposed between the lower surface of the rigid base section and the upper surface of the flexible seat section, defining an air chamber; and a cover, covering at least a portion of the seat section; and at least one air passage, extending from the air chamber;

the flexible seat section deflecting between (i) a first position in which the seat section is substantially undeflected and defines the air chamber, and (ii) a second position in which the seat section deflects into the air chamber forcing air from the air chamber and through the at least one air passage.

20. The snowmobile seat of claim 19, further comprising:

first fasteners and second fasteners, configured to be coupled between the base section and the snowmobile, the first fasteners being coupled to the base section and configured to be coupled to the snowmobile to resist horizontal movement between the base section and the snowmobile, and to maintain a connection between the second fasteners, the second fasteners being coupled to the base section and configured to be coupled to the snowmobile to resist vertical movement between the base section and the snowmobile, and to maintain a connection between the first fasteners.

21. A snowmobile seat, comprising:

a flexible seat section formed of open cell foam and having an upper surface over which a rider may sit;

a substantially rigid base section, supporting the flexible seat section, formed of a closed cell foam with cell walls and cell voids such that the base section is substantially rigid and light weight; and a cover, covering at least the flexible seat section, made of a water resistant material to resist moisture from being absorbed by the flexible seat section.

22. The snowmobile seat of claim 21, further comprising:

hook-and-loop type fasteners and snap type fasteners, configured to be coupled between the base section and the snowmobile, the hook-and-loop type fasteners being coupled to the base section and configured to be coupled to the snowmobile to resist horizontal movement between the base section and the snowmobile, and to maintain a connection between the snap type fasteners, the snap type fasteners being coupled to the base section and configured to be coupled to the snowmobile to resist vertical movement between the base section and the snowmobile, and to maintain a connection between the hook-and-loop type fasteners.

23. The snowmobile seat of claim 21, further comprising:

a space, disposed between the substantially rigid base section and the flexible seat section, defining an air chamber; and at least one air passage, extending from the air chamber;

the flexible seat section deflecting between (i) a first position in which the seat section is substantially undeflected and defines the air chamber, and (ii) a second position in which the seat section deflects into the air chamber forcing air from the air chamber and through the at least one air passage.

* * * * *